United States Patent [19]

Cooper et al.

[11] 4,188,888
[45] Feb. 19, 1980

[54] REINFORCED CENTER BEARING LINER

[75] Inventors: Jerry W. Cooper, Waynesville; Homer N. Holden, Sylva; Doyle V. Haren, Clyde, all of N.C.; John S. Haley, Centerville; M. John Somers, Dayton, both of Ohio

[73] Assignee: Dayco Corporation, Dayton, Ohio

[21] Appl. No.: 841,175

[22] Filed: Oct. 11, 1977

[51] Int. Cl.[2] .......................... B61F 5/16; F16C 17/04; F16C 17/10
[52] U.S. Cl. ............................. 105/199 C; 308/137; 428/461
[58] Field of Search .................. 105/199 C, 199 CB; 308/137, 138; 428/136, 247, 461

[56] References Cited

U.S. PATENT DOCUMENTS

| 2,238,681 | 4/1941 | Dorough | 428/461 |
|---|---|---|---|
| 2,258,640 | 10/1941 | Beckette | 308/137 |
| 3,111,419 | 11/1963 | Nahin | 428/461 X |
| 3,257,969 | 6/1966 | Thomas | 105/199 C |
| 3,264,215 | 8/1966 | Smith et al. | 308/137 X |
| 3,297,461 | 1/1967 | Siddall | 428/136 |
| 3,455,775 | 7/1969 | Pohl et al. | 428/461 |
| 3,466,102 | 9/1969 | Goodwyn | 308/137 |
| 3,667,820 | 6/1972 | Sherrick | 308/137 X |
| 3,679,513 | 7/1972 | Addinall et al. | 428/461 X |
| 3,813,315 | 5/1974 | Valyi | 428/461 X |
| 3,894,676 | 7/1975 | Oppenheim et al. | 308/137 X |
| 4,029,837 | 6/1977 | Leatherman | 428/247 |
| 4,040,362 | 8/1977 | Oppenheim et al. | 105/199 C X |
| 4,075,951 | 2/1978 | Chierici et al. | 308/137 X |
| 4,112,851 | 9/1978 | Rousseau et al. | 308/137 X |

Primary Examiner—Howard Beltran
Attorney, Agent, or Firm—Reuben Wolk

[57] ABSTRACT

A wear-resistant liner for center plate structure of a railway vehicle is provided and such liner is defined by an ultra high molecular weight polymeric material having a reinforcement embedded in the polymeric material which serves as a matrix for and substantially completely surrounds the reinforcement and the reinforcement comprises a structure having openings therein for receiving the polymeric material completely therethrough and enabling better embedment of the structure, and such structure serves to reinforce and prevent cold flow of the polymeric material.

10 Claims, 22 Drawing Figures

REINFORCED CENTER BEARING LINER

BACKGROUND OF THE INVENTION

Railway vehicles such as locomotives and cars of all types pulled by such locomotives are usually comprised of a main body provided with body bolsters each of which has a body center plate and each body center plate serves to transfer the load of the body to an associated truck which rides on the usual railroad tracks. Each truck is provided with a truck bolster and a bolster bowl usually defined by a truck center plate having an upstanding peripheral flange. Each body center plate is received within an associated flange and supported by the associated truck center plate such that the entire load of the car body is transmitted through the center plates.

With this type of construction the center plates and associated parts are subjected to substantial operating loads. In addition, such center plates and associated parts are subjected to foreign objects including sand, grit, weld spatter, and the like requiring frequent expensive lubrication and comparatively frequent replacement of worn and damaged parts.

Heretofore, the main thrust in attempting to reduce the severity of the wear problem between center plate structures has been to provide so-called metal liner having substantially greater hardness than the center plate structures themselves in an effort to reduce wear and minimize damage by foreign objects.

However, even with the provision of such hard metal liners the basic problem of excessive wear of metal parts still exists.

SUMMARY

It is a feature of this invention to provide a wear-resistant liner for center plate structure of a railway vehicle which eliminates the need for providing comparatively expensive wear liners made of hard metal.

Another feature of this invention is to provide a liner of the character mentioned made of an ultra high molecular weight polymeric material which is capable of providing the desired performance without requiring lubrication over a substantial operating life, which may exceed a million operating miles, of the railway vehicle on which the liner is used.

Another feature of this invention is to provide a wear-resistant liner which is capable of enveloping and absorbing foreign objects, such as, sand, grit, weld spatter, and the like without impaired performance while assuring the avoidance of a so-called rigid car.

Another feature of this invention is to provide a liner of the character mentioned which does not require lubrication.

Another feature of this invention is to provide a liner of the character mentioned which though made basically of an electrical insulating material provides electrical continuity therethrough enabling dissipation of static electricity from its vehicle body to its associated trucks by utilizing electrically conductive particles dispersed therethrough.

Another feature of this invention is to provide a liner of the character mentioned having reinforcing means provided as integral part thereof.

Another feature of this invention is to provide a liner of the character mentioned having a disc-like configuration.

Another feature of this invention is to provide a liner of the character mentioned having a tubular right circular cylindrical configuration.

Another feature of this invention is to provide a liner of the character mentioned having a cup-shaped configuration.

Accordingly, it is an object of this invention to provide a liner for center plate structure of a railway vehicle having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
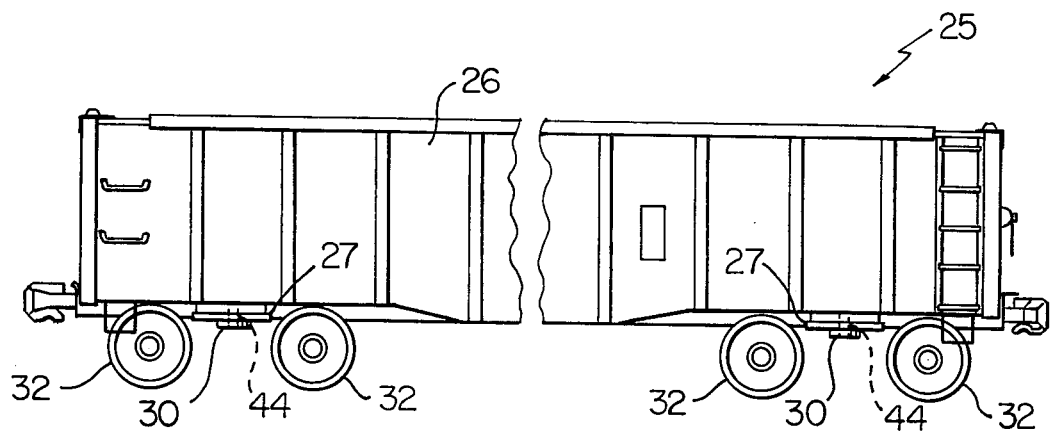
FIG. 1 is a view in elevation with the central portion thereof broken away illustrating an exemplary railway vehicle in the form of a railway car and showing only the wheels of its trucks so that the body bolsters and a body center plate comprising such railway car may be easily viewed.
Figure 2:
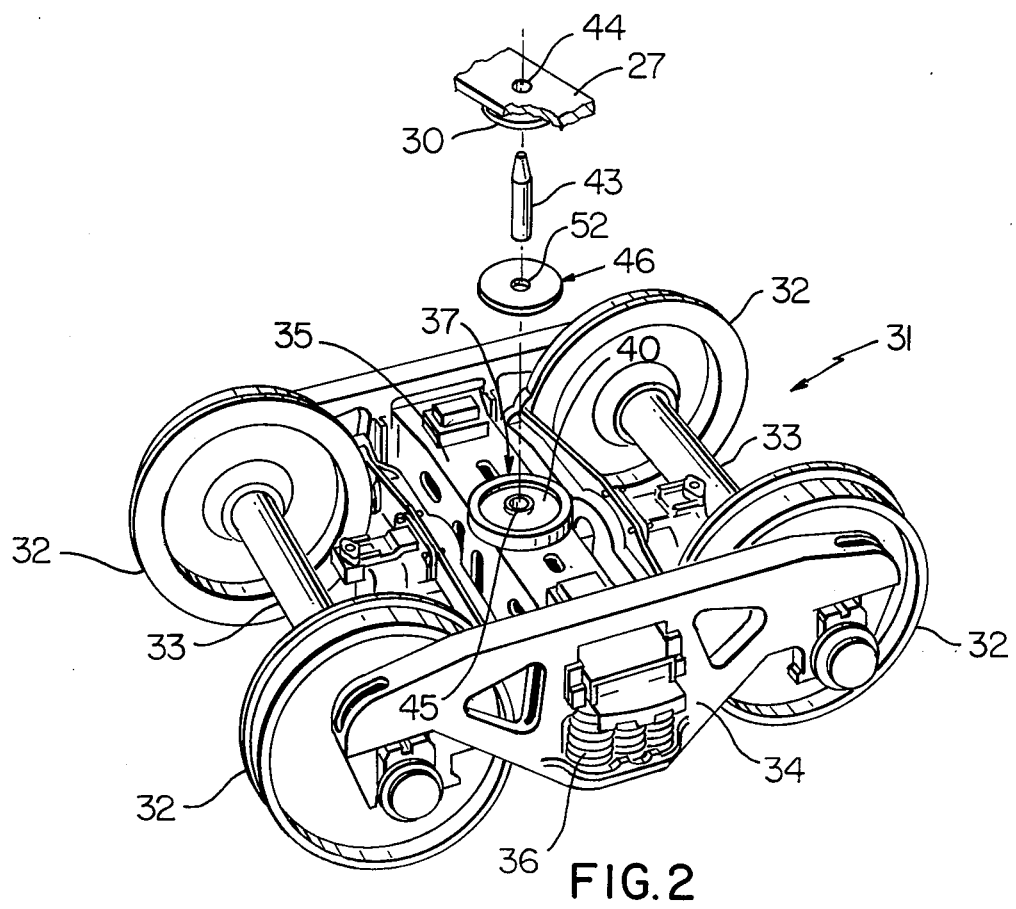
FIG. 2 is a perspective view with parts exploded, parts broken away, and parts in cross section illustrating a typical truck and certain associated components comprising the railway car of FIG. 1 and particularly showing a body bolster and its center plate, a truck bolster and its center plate, a center pin disposed between such center plates and one exemplary embodiment of the wear-resistant disc like liner of this invention disposed between the center plates.

Reference is now made to FIG. 1 of the drawings which illustrates main opposite end portions of an exemplary railway vehicle in the form of a gondola type railway car which is designated generally by the reference numeral 25 and showing only the wheels of the trucks provided at such opposite end portions. The car 25 has the usual car body 26 and includes body bolsters 27, one at each end thereof. Each body bolster 27 has a body center plate 30 of a type which is well known in the art whereby the entire load of the car body 26 is carried through the body center plates 30 to the car trucks 31 provided at opposite ends of the car body. An exemplary truck, of the two trucks used on the car 25, is illustrated in FIG. 2 of the drawings and designated by the general reference numeral 31.

Each truck 31 comprises the usual plurality of four wheels each designated by the same reference numeral 32 and an axle 33 extends between each associated pair of wheels 32. The truck 31 also has a structural frame assembly 34 carried by the axles 33 which are rotatable relative thereto and the frame assembly carries a truck bolster 35 employing suitable resilient mounting means comprising compression spring sets 36.

The truck bolster 35 is comprised of a truck bolster bowl which is designated generally by the reference numeral 37 (also see FIG. 3) and the truck bolster bowl 37 is defined as an integral part of the truck bolster 35 using techniques which are known in the art. The truck bolster bowl 37 comprises a truck center plate 40 which has an upstanding peripheral flange 41 which has a right circular cylindrical inside surface 42. The car body center plate 30 is particularly adapted to be received within the flange 41 and in particular within the right circular cylindrical surface 42 thereof whereby the body center plate 30 is supported by the truck center plate 40 and the entire load of the railway car 25 is carried by the center plates 30 and 40.

The railway car 25 also has a plurality of center pins 43 which are also referred to in the art as king bolts. The upper portion of each center pin 43 extends through an opening or bore 44 which extends through the body center plate 30 and continues into the body bolster 27. The bottom portion of each center pin 43 extends into an opening or bore 45 which extends through the truck center plate 40 and continues into the truck bolster 35. Each truck 31 turns about its associated center pin 43 which, in essence, serves as a safety pin, however, the loads of the car body 26 are taken by the center plates 30 and 40.

From the above description it is apparent that the center plates 30 and 40 carry substantial loads and this invention provides a liner 46 between center plates 30 and 40 which is a substantial improvement over the usual hard steel liner provided between a body center plate and a truck center plate 40. The liner 46 is wear resistant and has unique properties in that it eliminates the need for conventional lubrication, such as lubricating oil or the like, and eliminates the need to provide expensive hard metal liners or inserts as required by the prior art. In addition, the liner 46, though made of a non-metallic plastic material, will not cold flow under the substantial loads yet functions to envelop or absorb foreign objects such as sand, grit, weld spatter, and similar objects likely to be encountered during operation of the railway car.

The liner 46 is defined by or made of a suitable polymeric material which is designated by the reference numeral 47 and has a molecular weight of at least two million and preferably such molecular weight is generally in the range of 2 to 5 million and may be as high as 7 million. The polymeric material may be any suitable polymeric material known in the art; however, such polymeric material is preferably what is commonly referred to in the art as ultra-high molecular weight polyethylene.

Figure 3:
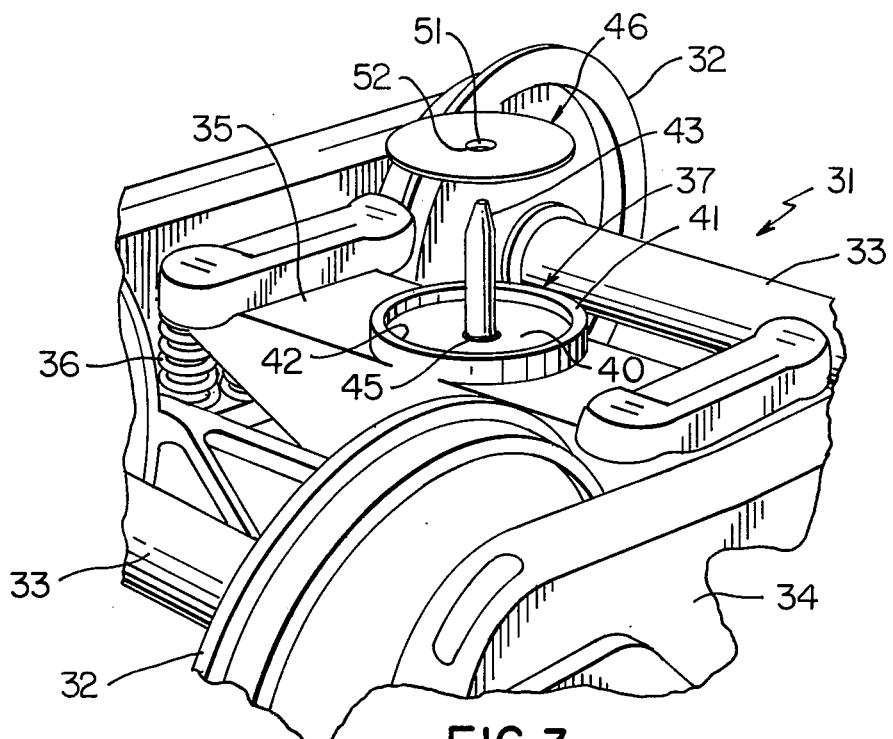
FIG. 3 is an enlarged fragmentary perspective view of the central portion of the truck of FIG. 2 particularly illustrating a truck bolster bowl, centering pin, and the exemplary disc-like liner disposed thereabove.

The exemplary liner 46 of FIGS. 2 and 3 is a disc-like liner having opposed planar surfaces (FIG. 5) designated by the same reference numeral 48, a right circular cylindrical outside surface 50 and a right circular cylindrical surface 51 defining a central opening 52 which is particularly adapted to receive the center pin 43 therethrough. The disc-like liner 46 also has reinforcing means provided therein and such reinforcing means is illustrated in detail in FIGS. 4–5 and designated by the reference numeral 53. The reinforcing means comprises a metal member 53 having openings 54 defined therein for receiving polymeric material 47 defining such liner completely through openings 54. The reinforcing metal member 53 is in the form of a regular expanded metal member made in accordance with techniques known in the art and the expanded metal member 53 is preferably embedded within the polymeric material 47 so that it is within the confines of the planar surfaces 48 and as illustrated typically at 55 in FIG. 5 for example, whereby the polymeric material 47 serves as a matrix for the metal reinforcing metal member 53.

The polymeric matrix material 47 defining the liner 46 envelops or absorbs foreign objects of the character described above and serves as a liner or bearing member which does not require lubrication, as previously mentioned. In addition, a typical liner operating under conditions where it has absorbed numerous foreign objects has been in actual service on its railway car over one-half million miles. It is believed that a service life exceeding one million miles may be achieved with minimum wear of opposed planar surfaces 48 with the reinforcing member remaining embedded with the substantial space indicated at 55 beneath each planar surface 48.

The reinforcing member 53 is an expanded metal structure having roughly diamond-shaped openings 54 therein defining such structure as a grid-like structure and although any suitable expanded metal material may be used such material is preferably in the form of standard expanded metal carbon steel. In one exemplary embodiment of the invention a ¾ inch No. 16 material having 0.060 inch thickness and an 80 percent open area was satisfactorily made to define member 53 which was embedded in a disc having an overall thickness of ¼ inch. The outside diameter of such a disc was 14 inches with the diameter of the center hole being 2½ inches.

Other exemplary embodiments of a wear resistant liner for center plate structure of a railway vehicle in accordance with this invention are illustrated in FIGS. 6, 7, 8, 11, 12, 13, 14–15, 16, 17–18, 19, 20, 21, and 22 of the drawings. The liners illustrated in FIGS. 6, 7, 8, 11, 12, 13, 14–15, 16, 17–18, 19, 20, 21, and 22 are very similar to the liner 46, therefore, such liners will be designated by the reference numerals 46A, 46B, 46C, 46D, 46E, 46F, 46G, 46H, 46I, 46J, 46K, 46L, and 46M respectively and representative parts of each liner which are similar to corresponding parts of the liner 46 will be designated in the drawings by the same reference numerals as in the liner 20 (whether or not such representative parts are mentioned in the specification) followed by the letter designation A, B, C, D, E, F, G, H, I, J, K, L, and M and not described again in detail. Only those component parts of each liner which are substantially different from corresponding parts of the liner 46 will be designated by a new reference numeral also followed by an associated letter designation and described in detail.

Each liner mentioned in the next preceding paragraph is made of polymeric material which in each instance will be designated by the reference numeral 47 followed by the associated letter designation; and, it is to be understood that the polymeric material in each instance is a high molecular weight polymeric material such as high molecular weight polyethylene with the molecular weight being at least 2 million and preferably within the previously described range.

Figure 6:
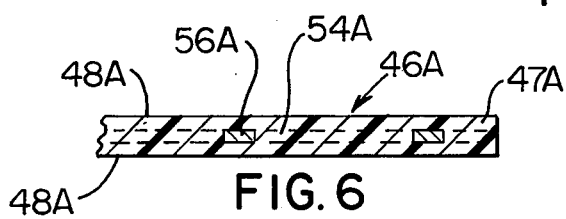
FIG. 6 is a view similar to FIG. 5 illustrating another exemplary embodiment of the liner of this invention having a reinforcing member in the form of an expanded metal member which is flattened.

The liner 46A of FIG. 6 has opposed planar surfaces 48A and a reinforcing metal member 56A embedded within its polymeric material 47A which serves as a matrix therefor. The reinforcing member 56A is in the form of a flattened expanded metal member which also has a grid-like structure and diamond-shaped openings 54A therein.

Figure 4:
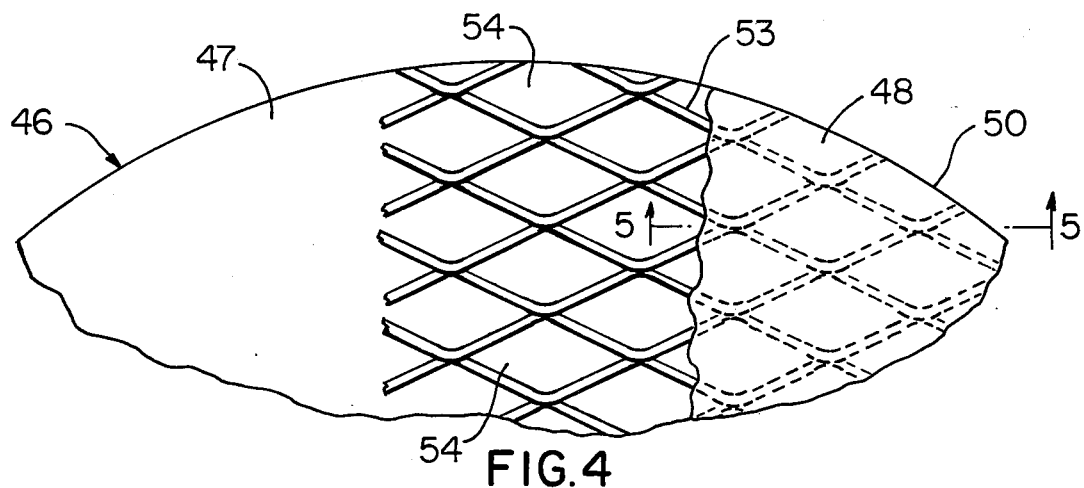
FIG. 4 is an enlarged fragmentary plan view of the liner of FIGS. 2 and 3 with parts broken away particularly illustrating reinforcing means in the form of an expanded metal member embedded within polymeric material comprising such liner.
Figure 7:
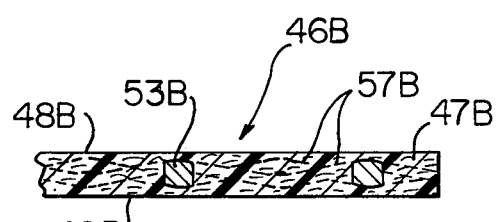
FIG. 7 is a view similar to FIG. 5 illustrating another exemplary embodiment of the liner of this invention having electrically conductive particles disposed therein.
Figure 5:
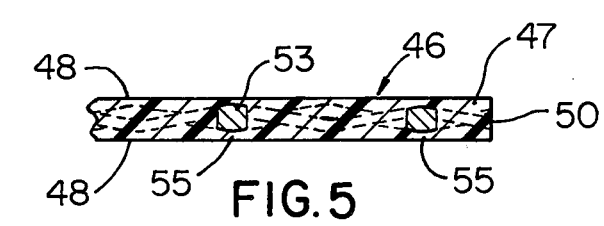
FIG. 5 is a fragmentary cross-sectional view taken essentially on the line 5—5 of FIG. 4 and illustrating the reinforcing member which is in the form of an ordinary expanded metal member.

The liner 46B of FIG. 7 is comprised of a polymeric matrix material 47B and a reinforcing metal member 53B of regular expanded metal which is substantially identical to the member 53 of the liner 46 of FIG. 4; however, in addition, the liner 46B has a plurality of electrically conductive particles, a representative few of which are designated by the same reference numeral 57B. The particles are provided to assure electrical conductivity across the surfaces 48B and between the body center plate 30 and the truck center plate 40 to prevent the build up of static electricity in the railway car body 26, for example. The particles 57B may be of any suitable electrically conductive metallic or carbonaceous material.

Figure 10:
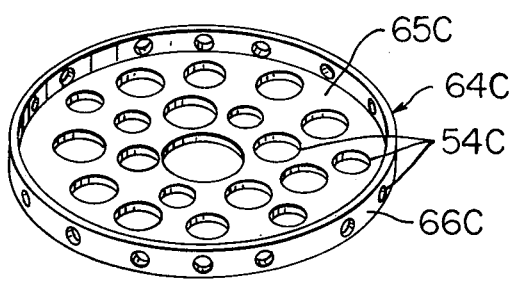
FIG. 10 is a perspective view illustrating the metal member of FIG. 9 formed in its cup-shaped configuration and prior to embedding in the polymeric matrix material to define the cup-shaped liner of FIG. 8.
Figure 8:
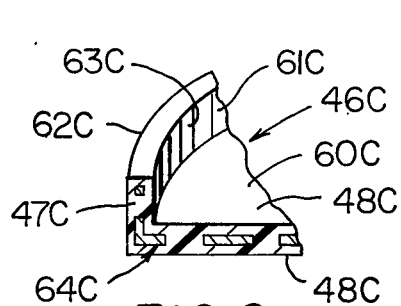
FIG. 8 is a fragmentary perspective view with a portion thereof in cross section illustrating another exemplary embodiment of the liner of this invention in the form of a cup-shaped liner having a reinforcing member embedded therein.

The liner 46C of FIG. 8 is in the form of a cup-shaped liner comprised of a disc-like bottom portion 60C which is adjoined by a peripheral tubular flange 61C. The disc-like bottom portion has opposed planar surfaces 48C defining opposed surfaces of the disc-like bottom portion 60C and the flange has a right circular cylindrical outside surface 62C and a right circular cylindrical inside surface 63C defining its opposed surfaces. The peripheral flange 61C adjoins the disc-like portion 60C at the peripheral edge thereof. The liner 46C also has reinforcing means embedded within the polymeric material 47C defining same and such reinforcing means is in the form of a metal cup-shaped reinforcing member illustrated in FIG. 10 and designated by the reference numeral 64C.

Figure 9:
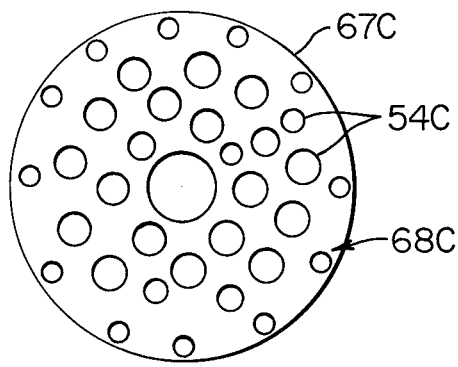
FIG. 9 is a plan view of a flat circular metal structure prior to forming thereof into a cup shape to define a cup-shaped metal reinforcing member embedded in the liner of FIG. 8.

The cup-shaped reinforcing member 64C has a planar bottom portion 65C and a peripheral flange portion 66C defined as an integral part thereof. The cup-shaped reinforcing member 64C is defined from a flat circular disc 67C which is illustrative in plan view in FIG. 9. The disc has various size openings defined therein all of which are designated by the same reference numeral 54C and such openings allow polymeric material 47C to be received therethrough. The openings 54C defining the flange 66C may be smaller than the majority of the openings in the disc-like bottom portion 65C and as illustrated at 68C in FIG. 9, for example. The cup-shaped metal reinforcing member 64C is disposed within the matrix-like polymeric material 47C so that such polymeric material completely surrounds the member 64C.

Figure 11:
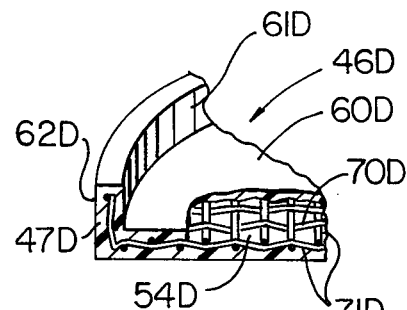
FIG. 11 is a view similar to FIG. 8 illustrating another exemplary embodiment of the liner of this invention having a metal cup-shaped reinforcing member made of woven metal wires.

The liner 46D of FIG. 11 is also in the form of a cup-shaped member having a disc-like bottom portion 60D adjoined by an integral peripheral flange 61D. The cup-shaped liner 46D is very similar to the cup-shaped liner 46C with the main difference being in the reinforcing means provided therein and such reinforcing means is in the form of a single-piece metal reinforcing member 70D embedded within the polymeric material 47D. The reinforcing member 70D is basically cup-shaped thereby reinforcing not only the planar portion 60D but also the flange portion 61D of the cup-shaped liner 46D. The reinforcing member 70D is made of woven metal members such as wires 71D (which in this example are square woven) and has openings 54D allowing unobstructed flow of polymeric material 47D therethrough for optimum embeddment of the member 70D in such polymeric material.

Figure 12:
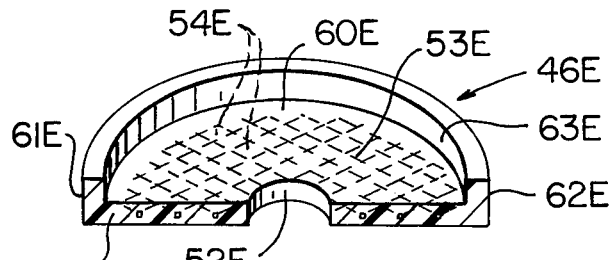
FIG. 12 is a perspective view showing half of another exemplary embodiment of a cup-shaped liner of this invention defined by a disc-like central portion and a peripheral flange in which only the disc-like portion has reinforcing means therein.

The liner 46E of FIG. 12 is also a cup-shaped liner which is similar to the liners 46C and 46D and is comprised of a disc-like bottom portion 60E adjoined by a peripheral flange 61E. However, the liner 46E is provided with reinforcing means 53E only in its disc-like bottom portion 60E whereby the flange 61E is free of reinforcing means. The reinforcing member 53E is an expanded metal member substantially identical to the expanded metal member 53 of FIG. 4 and such expanded metal member 53E has open spaces 54E allowing free flow of polymeric material through such spaces. The liner 46E has right circular cylindrical outside surface 62E defining the outside surface of its flange 61E and a right circular cylindrical inside surface 63E defining the inside surface of its flange 62E. The liner 46E also has a central opening 52E therein for receipt of the center pin 43 therethrough and in a similar manner as described in connection with the liner 46 and it will be appreciated that liners 46C and 46D have similar central openings although such openings are not illustrated in FIGS. 8 and 11 of the drawings.

Figure 13:
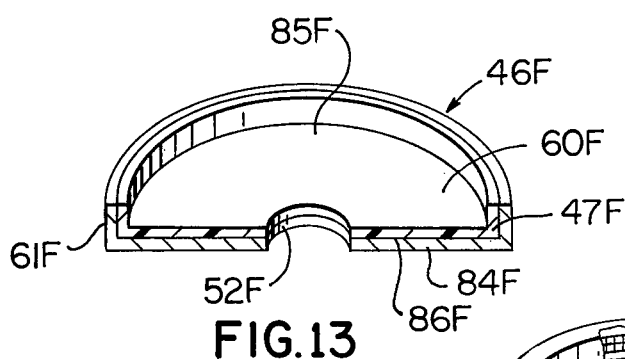
FIG. 13 is a view similar to FIG. 12 illustrating another exemplary embodiment of a cup-shaped liner of this invention comprised of a cup-shaped inner liner made of a polymeric material which is bonded to a cup-shaped outer liner made of a metallic material.

The liner 46F of FIG. 13 is also a cup-shaped liner defined by disc-like bottom portion 60F adjoined by a peripheral flange 61F and having pin receiving opening 52F therethrough. However, the reinforcing liner 46F has reinforcing means in the form of a cup-shaped disc member preferably in the form of a metal member 84F which is laminated to a polymeric cup-shaped member 85F to define, in essence, a two-ply cup-shaped liner 46F. The polymeric member 85F is made of ultra high molecular weight polyethylene 47F, or the like, which is free of embedded reinforcing means. The cup-shaped metal member 84F is made of any suitable hard metal and any suitable bonding or adhesive means 86F may be employed to bond the members together. It will also be seen that liner 46F also has a central opening 52F through its disc-like two ply flat bottom portion.

Figure 14:
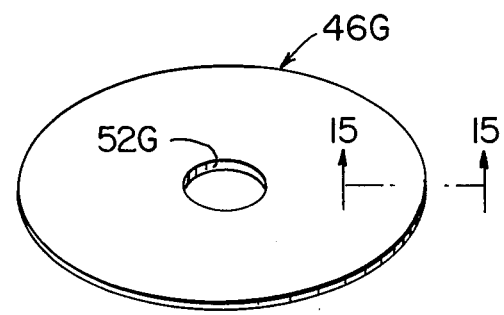
FIG. 14 is a perspective view illustrating another exemplary embodiment of a disc-like center plate liner which is free of reinforcing means embedded therein.
Figure 15:
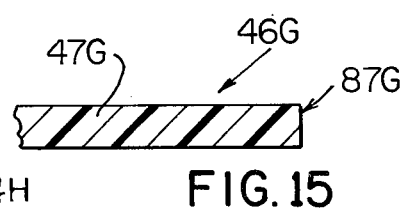
FIG. 15 is a fragmentary cross-sectional view taken essentially on the line 15—15 of FIG. 14.

The liner 46G of FIG. 14 is made of polymeric material 47G free of reinforcing means or the like and as illustrated at 87G in FIG. 15 by the cross-hatched member. The member 46G also has a pin-receiving opening 52G disposed centrally therethrough.

Figure 16:
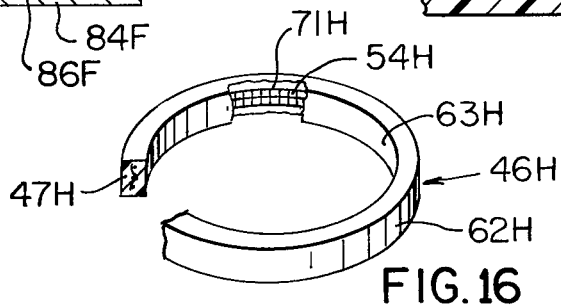
FIG. 16 is a fragmentary perspective view with a portion thereof broken away and a section shown in cross section illustrating another exemplary embodiment of a liner which may be used with or without a disc-like liner of this invention.
Figure 17:
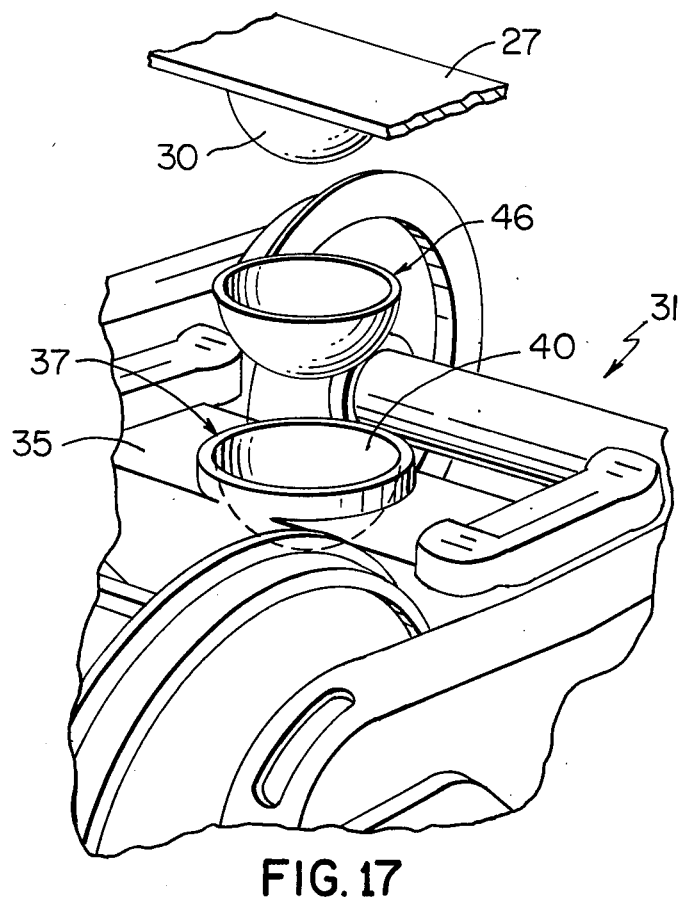
FIG. 17 is a fragmentary view similar to the center portion of FIG. 3 illustrating another exemplary embodiment of a truck provided with a truck bolster bowl of hemispherical configuration which is particularly adapted to receive a cup-shaped liner having a tubular hemispherical configuration therewithin and such liner in turn receives a bolster body center plate of corresponding outwardly convex hemispherical configuration.

The liner 46H of FIG. 16 has a basically tubular configuration which for ease of presentation is shown as a right circular cylindrical configuration defined by a right circular cylindrical outside surface 62H and a right circular cylindrical inside surface 63H. The liner 46H also has reinforcing means 71H suitably embedded in its matrix material 47H. The reinforcing means 71H is in the form of a woven metal member 71H made in tubular form and provided with openings 54H for receiving polymeric material therethrough.

The liners 46I, 46J, 46K, 46L, and 46M are particularly adapted to be used in a railway vehicle such as the vehicle 25 having a body bolster 27 provided with a body center plate 30 which has a downwardly convex hemispherical configuration and a truck designated by the reference numeral 31 having a truck bolster 35 provided with a center plate 40 which has an upwardly concave configuration. The truck center plate 40 is particularly adapted to receive the body center plate 30 therewithin. Each liner is disposed between its cooperating hemispherical plates 30 and 40 and each liner 46I, 46J, 46K, 46L, and 46M is made of polymeric material designated by the reference numeral 47 followed in each instance with the appropriate letter designation and as mentioned earlier.

Figure 18:
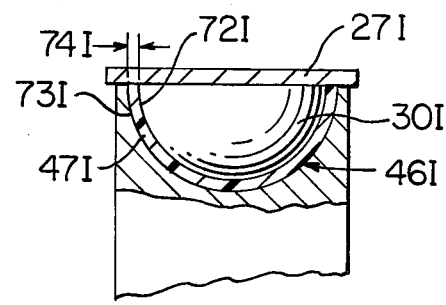
FIG. 18 is a fragmentary view with parts in elevation and parts in cross section illustrating the truck center plate and body center plate of the structure of FIG. 17 with one exemplary embodiment of the hemispherical liner of this invention disposed therebetween.

The liner 46I of FIG. 18 is a plain liner free of additional reinforcing means and has a smooth hemispherical inside surface 72I and a smooth hemispherical outside surface 73I defining a liner thickness 74I. The liner 46I serves as both liner and hemispherical bearing member.

Figure 19:
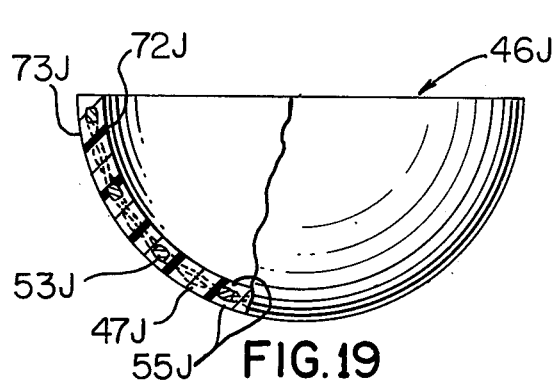
FIG. 19 is a view in elevation with a part broken away and another part in cross section illustrating another exemplary embodiment of the hemispherical liner of this invention which has an embedded reinforcing member in the form of a cup-shaped expanded metal member.

The liner 46J of FIG. 19 has an inside surface 72J, an outside surface 73J, and reinforcing means 53J in the form of a regular expanded metal member 53J formed in a hemispherical shape. The expanded metal used to define member 53J is substantially identical to the metal used to define member 53 of FIG. 4. The hemispherical member is embedded within the matrix like material 47J defining the liner 46J and with the member 53J being embedded within the confines of the surfaces 73J and 72J as illustrated at 55J in a few typical locations, for example.

Figure 20:
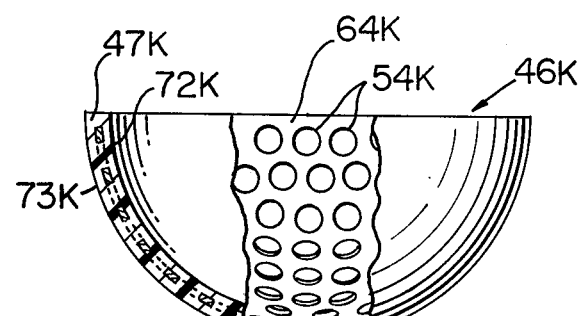
FIG. 20 is a view similar to FIG. 19 illustrating another exemplary embodiment of a hemispherical liner of this invention which has an embedded reinforcing member in the form of a cup-shaped tubular hemispherical shell having punched holes extending therethrough.

The liner 46K of FIG. 20 is comprised of polymeric material 47K and cup-shaped reinforcing means or member 64K having a hemispherical tubular shell-like configuration and embedded within the confines of the surfaces 72K and 73K. The reinforcing member 64K has openings 54K extending therethrough which allow free flow of polymeric material therethrough and assure optimum embeddment of the member 64K within the polymeric material 47K.

Figure 21:
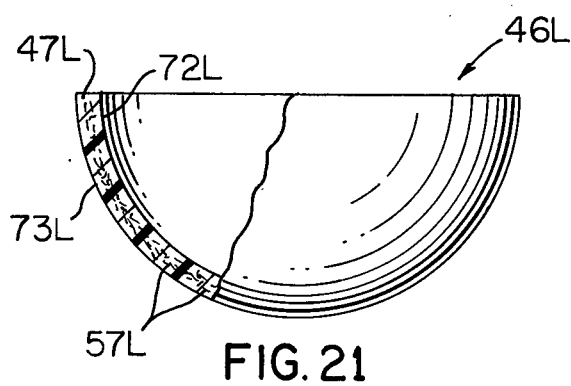
FIG. 21 is a view similar to FIG. 19 illustrating another exemplary embodiment of a basically unreinforced hemispherical liner of this invention which has electrically conductive particles disposed therethrough.

The liner 46L of FIG. 21 is comprised with inside surface 72L and outside surface 73L and is in the form of a plain member being defined by high molecular weight polymeric material 47L; however, the liner 46L has electrically conductive particles a few of which are designated by the reference numeral 57L. As described earlier, the particles 57L, which are identical to particles 57, assure electrical continuity between the body center plate 30 and the truck center plate 40 thereby preventing build up of static electricity in the car body 26.

Figure 22:
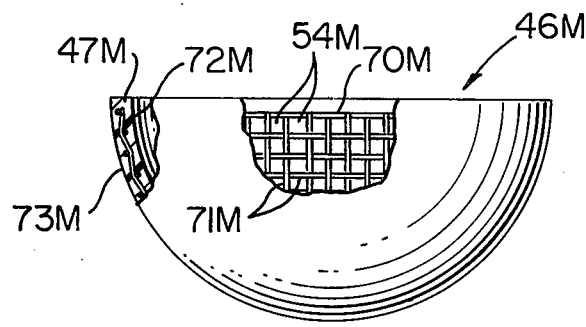
FIG. 22 is a view similar to FIG. 19 illustrating another exemplary embodiment of a hemispherical liner of this invention which has an embedded reinforcing member in the form of a cup-shaped member made of woven wire.

The liner 46M of FIG. 22 has an inside surface 72M and an outside surface 73M and reinforcing means in the form of a hemispherical woven metal wire reinforcing member 70M made of metal wires 71M defining openings 54M. The woven wire reinforcing member 70M is embedded in polymeric material 47M.

The various hemispherical liners 46I, 46J, 46K, 46L, and 46M may be considered as shell-like or cup-shaped liners and each has a particular thickness. Each of these liners preferably has a smooth inside and outside surface.

The various center plate liners 46 and 46A through 46M have been described herein as liners; however, it will be appreciated that this is a term of the art and reference to liner is intended to cover the fact that such liners provide a lining function as well as serve as bearings transmitting loads of the center plates therethrough.

The various reinforcing members for the disclosed liners have been described as being metal members; however, it is to be understood that metal need not necessarily be employed but other non-metallic reinforcing materials may be used, if desired.

The liners 46 and 46A through 46M have been described herein as being made of polymeric material preferably in the form of ultra high molecular weight polyethylene having a molecular weight generally in the range of 4 to 7 million. However, it will be appreciated that any suitable ultra high weight polymeric material may be used for this purpose including modified versions of polypropylene, nylon, teflon, and the like.

The various cup-shaped liners 46C through 46F described herein have a substantially flat disc-like central portion provided with a central pin-receiving opening therethrough and each flat disc-like portion is adjoined at its periphery by an upstanding flange. For ease of presentation, the flange in each instance has been illustrated and described as comprising a right circular cylindrical inside surface and a right circular cylindrical outside surface. However, it is to be understood that either or both of these inside and outside cylindrical surfaces of the flange may be adjoined at its edge by an associated annular surface portion disposed at an angle relative to the main cylindrical surface to provide any desired taper or flare to such a flange. For example, the inside cylindrical surface may be provided with an outwardly flaring annular portion of frustoconical configuration so that it may more readily receive a body center plate therewithin. In addition, the entire flange may be disposed from its base upwardly so that it flares therefrom a sufficient amount to allow easy entry of the body center plate therewithin. For example, such entire flange may have a tubular frustoconical upwardly flaring configuration.

The liners 46 and 46A through 46M have been described herein as being made of polymeric material preferably in the form of ultra high molecular weight polyethylene having a molecular weight generally in the range of 2 to 5 million. The preferred technique for determining or establishing this molecular weight is referred to as the intrinsic viscosity test and is widely used in the United States.

In this disclosure of the invention reference has been made to molecular weight being at least two million, generally in the range of 2 to 5 million, and the like. However, it is to be understood that this reference to molecular means average molecular weight.

While present exemplary embodiments of this invention, and methods of practicing the same, have been illustrated and described, it will be recognized that this invention may be otherwise variously embodied and practiced within the scope of the following claims.

What is claimed is:

1. In a wear-resistant liner for center plate structure of a railway vehicle, said liner being defined by an ultra high molecular weight polymeric material, the improvement comprising reinforcing means embedded in said polymeric material which serves as a matrix for and substantially completely surrounds said reinforcing means, said reinforcing means comprising a structure having openings therein for receiving said polymeric material completely therethrough and enabling better embedment of said structure, said structure providing reinforcement and preventing cold flow of said polymeric material.

2. A liner as set forth in claim 1 having a disc-like configuration.

3. A liner as set forth in claim 1 and further comprising a plurality of electrically conductive particles embedded in said polymeric material in a randomly disposed manner and providing electrical continuity therethrough to prevent build up of static electricity on structure on either side thereof, said polymeric material also serving as a matrix for said particles.

4. A liner as set forth in claim 1 having a tubular configuration.

5. A liner as set forth in claim 1 having a generally cup-shaped configuration.

6. A liner as set forth in claim 5 in which said cup-shaped configuration is defined by a planar disc-like bottom portion adjoined by a peripheral flange extending substantially perpendicularly therefrom.

7. A liner as set forth in claim 5 in which said cup-shaped member has a substantially hemispherical configuration.

8. In a railway vehicle having; a body provided with a body bolster and a body center plate; a truck provided with a truck bolster and a bolster bowl defined by a truck center plate having an upstanding peripheral flange; said body center plate being received within said flange and being supported by said truck center plate; and a wear-resistant liner disposed between said center plates; said liner being defined by an ultra high molecular weight polymeric material; the improvement comprising reinforcing means embedded in said polymeric material which serves as a matrix for and substantially completely surrounds said reinforcing means, said reinforcing means comprising a structure having openings therein for receiving said polymeric material completely therethrough and enabling better embedment of said structure, said structure providing reinforcement and preventing cold flow of said polymeric material.

9. In a railway car having; a body provided with a body bolster and a body center plate; a truck provided with a truck bolster and a bolster bowl defined by a truck center plate having an upstanding peripheral flange; said body center plate being received within said flange and being supported by said truck center plate; said center plates and bolsters having cooperating vertically aligned openings; a center pin extending through said openings; and a wear-resistant liner disposed between said center plates; said liner being defined by ultra high molecular weight polyethylene; said liner having a central opening therein for receiving said pin therethrough; the improvement comprising reinforcing means embedded in said polymeric material which serves as a matrix for and substantially completely surrounds said reinforcing means, said reinforcing means comprising a structure having openings therein for receiving said polymeric material comletely therethrough and enabling better embedment of said structure, said structure providing reinforcement and preventing cold flow of said polymeric material.

10. The improvement of claim 9 in which said liner has a cup-shaped configuration, comprised of a flat disc-like portion having an upstanding peripheral flange defined as an integral part thereof, said opening is disposed centrally within said flat disc-like portion and has a right circular cylindrical configuration, and at least one of said flat disc-like portion and peripheral flange has said reinforcing means embedded therein.

* * * * *